(12) United States Patent
Knauf (10) Patent No.: US 7,048,961 B2
(45) Date of Patent: May 23, 2006

(54) METHOD FOR FREEZING EDIBLE MARINE ANIMALS

(75) Inventor: Jeff Knauf, Sitka, AK (US)

(73) Assignee: Alaska Ocean Products Corporation, Sitka, AK (US)

(*) Notice: Subject to any disclaimer, the term of this patent is extended or adjusted under 35 U.S.C. 154(b) by 8 days.

(21) Appl. No.: 10/654,590

(22) Filed: Sep. 2, 2003

(65) Prior Publication Data

US 2005/0031770 A1    Feb. 10, 2005

Related U.S. Application Data

(60) Provisional application No. 60/480,240, filed on Jun. 20, 2003.

(51) Int. Cl.
*A23L 1/325* (2006.01)
(52) U.S. Cl. .............................. 426/643; 62/57; 62/67; 426/524
(58) Field of Classification Search .............. 426/643, 426/524; 452/57, 67
See application file for complete search history.

(56) References Cited

U.S. PATENT DOCUMENTS

| | | | |
|---|---|---|---|
| 1,773,079 A | | 8/1930 | Birdseye |
| 2,722,036 A | | 11/1955 | Servidio |
| 3,453,684 A | | 7/1969 | Heck |
| 5,426,045 A | * | 6/1995 | Sawyer et al. .............. 435/392 |
| 5,761,913 A | | 6/1998 | Liberman et al. |
| 6,183,356 B1 | * | 2/2001 | Middleton et al. ............ 452/57 |
| 6,398,979 B1 | | 6/2002 | Koefod et al. |
| 6,440,325 B1 | | 8/2002 | Hartley et al. |
| 2001/0011716 A1 | | 8/2001 | Kaneko et al. |
| 2003/0198847 A1 | | 10/2003 | Jeffcoate e tal. |

OTHER PUBLICATIONS

Publication of Farm Animal Welfare Council, "Salmon," 3 pages, published on or before Aug. 27, 2003.
M. Braker, Handling Sportcaught Fish, Oct. 1992, 2 pages, Oregon State University—Extension Service.
R.W. Rottmann, R. Francis-Floyd, and R. Durborow, The Role of Stress in Fish Disease, southern Regional Aquaculture Center, Publication No. 474, Feb. 1992, 3 pages.
Publication of Canada Fisheries, Management Pacific Region, "Catch and Release tips—Sport Fishing", published at http://www-ops.pac.dfo-mpo.gc.ca/fm/Sport/catch.htm. 2 pages.
Understanding Fish Kills in Florida Freshwater Systems, 16 pages, Information Circular 107, University of Florida.
Martin Li, Glacier Bay Alaska: Catch and Release—into the Frying Pan, May 7, 2003, 4 pages, London.

(Continued)

*Primary Examiner*—Arthur L. Corbin
(74) *Attorney, Agent, or Firm*—Fitch, Even, Tabin & Flannery (57) ABSTRACT

Various methods useful in connection with catching and freezing fish are disclosed. Also disclosed is an immersion freezer. In preferred embodiments, fish or other items to be frozen are immersed in a cooling medium. The cooling medium comprises an organic cooling agent, which preferably is a carbohydrate, sugar alcohol, glycoside, or non-toxic oil.

4 Claims, 9 Drawing Sheets

OTHER PUBLICATIONS

Bob Middendorf, Iowa DNR Fisheries Biologist, Care and Cleaning of Your Catch, posted on http://www.state.ia.us/dnr/organiza/fwb/fish/isfish/insider/cleaning.htm, 5 pages.

Why Freeze At Sea, published at http://www.fao.org/wairdocs/tan/x5883e/x5883e01.htm, 5 pages.

Chris Johnson, Fishing Vessel Refrigeration and Seafood Handling, published at http://www.mpvs.com/ACj/ac_refer.htm, 10 pages.

Ken Hilderbrand, Freezing Fish, published at http://listproc.ucdavis.edu/archives/seafood/log9908/0004.html, Aug. 10, 1999, 2 pages.

Tecumseh FAQ's, Tecumseh Products India Limited, 2002, Published at http://www.tecumsehindia.com/faq.htm, 5 pages.

K.S. Hilderbrand, Jr., Preparation of Salt Brines for the Fishing Industry, 1998, 4 pages, Oregon State University.

Refrigeration Hall Facilities, Published at http://www.frperc.bris.ac.uk/about/about4.htm, 6 pages.

Calcium Chloride Market Reviews, General Chemical Industrial Products, 3 pages.

Peter Coy, Quote from Business Week, Fresher Frozen Fish Take A Briny Dip, 1996, TRUFRESH, LLC., 1 page.

TRUFRESH Unique Fresh Freezing Method, 1997-2003, 2 pages.

Gregory Sandler, Trufresh: A Company That's Truly Virtual: A high-tech Fish Processor Keeps Costs Low With A Bare-Bones Organization, Business Week. New York: Apr. 28, 1997, Issue 3524, p. ENT8, 4 pages.

New Freezing Process Improves Fish Texture, Taste., Frozen Food Age, May 1998, vol. 46, Issue 10, p. 58, 1/4p, 1bw, 1 page, EBSCO Publishing.

Praxair News Releases 2001, Praxair Technology, Inc. 1 page.

Freshline RH Immersion Freezer, 1996-2003, Air Products and Chemicals, 1 page.

New Immersion Freezer Forms Ice Mantles Easily. Hart Scientific, Inc., 2 pages.

Small Immersion Freezer Brings Big Advantages, Jun. 1, 1999, 2 pages, Manufacturing News, Allentown, PA.

Immersion Freezer LIN, Published at http://212.113.74.23/CES/Content/products/immersionfreezers, 1 page.

Better Roads For The Government/Contractor Project Team, Better Roads Magazine, Jul. 2001, 4 pages.

Description of Preparing Salmon in Brine solution at +38F with Molasses Mixed In, Published at http://home.att.net/~g.m.fowler/frame/Jerky/JerkyNYstripStory.txt, 3 pages.

Freezing At Sea, Published at http://www.fao.org/docrep/003/v3630e/V3630E14.htm, 9 pages.

Module 12, Refrigeration & Heat Pump System, SADC Industrial Energy Management Project, 23 pages.

Keven J. White and Peter Howgate, Glossary of Fish Technology Terms, Fisheries Industries Division, 88 pages.

* cited by examiner

METHOD FOR FREEZING EDIBLE MARINE ANIMALS

RELATED APPLICATION

This application claims priority to prior U.S. Provisional Patent Application Ser. No. 60/480,240, filed Jun. 20, 2003.

TECHNICAL FIELD OF THE INVENTION

The invention is in the field of freezing. In some embodiments, the invention is directed toward the freezing of edible marine animals, in particular salmon. In other embodiments, the invention is in the field of freezing devices, in preferred embodiments marine freezing devices.

BACKGROUND OF THE INVENTION

In commercial fishing operations, it is preferential to store the fish catch at a temperature that is deemed satisfactory to preserve the fish and retard spoilage. Conventionally, the fish are caught, killed, generally by any one of a number of operations, and stored in a cold hold at a temperature hovering around the freezing point of water (32° F.). Innumerable freezing methodologies and freezer types are known in the art, and typical freezers include plate freezers, blast freezers, tunnel freezers, spray brine freezers, and so forth. These freezers can be used with varying degrees of success to preserve the fish during and after the fishing voyage.

In recent years, farmed fish can become commercially more successful than fish caught in the wild. Generally, commercially farmed fish have been found superior to wild fish, notwithstanding the more favorable commercial impression that wild fish enjoy in the market. Although wild fish are generally believed to have a superior flavor and texture if cooked immediately after catching, in practice, by the time the fish are sold into the food markets, it is frequently the case that the quality of the wild fish catch has deteriorated substantially. The reasons for such deterioration are typically due to the lack of sound fishing techniques in the industry, many of which techniques are known but for various reasons not practiced commercially.

For instance, fish are known to decay and develop bad flavors and odors for a number of reasons. Often, when caught, the fish is subjected to substantially stressful conditions which causes the release of hormones. This hormone release is believed to contribute adversely to flavor and odor. For this reason, the prior art teaches to stun the fish prior to killing the fish to mitigate against the release of such hormones. Typical stunning methodologies include concussively shocking the fish or treating the fish with a stunning gas, which may be any inert non-toxic gas that displaces dissolved oxygen in ambient water.

Many fish, especially salmon, are known to be covered with a mucosal layer, also called a "slime" layer, while alive. The mucosal layer is believed to protect the fish from microbial attack and from passage of salts and other electrolytes. In many conventional fishing operations, fish are handled quite roughly while in an unfrozen state. Such conventional handling techniques can disrupt or destroy the mucosal layer over substantially the entire fish, thereby leaving the fish more susceptible to passage of salt into and out of the fish and to microbial degradation. Such handling also can lead to bruising of the fish and loss of scales, and can also lead to the loss of bone, protein, and other commercially valuable parts of the fish.

It is also known in the art that oxygen can lead to decay of the fish after death. For this and other reasons, it is known to bleed the fish upon death (or to cause death) to thereby remove the blood and consequently the oxygen carried by the blood. Bleeding is also believed to cause metabolic processes within the fish to cease. Likewise, for this reason it is known to glaze the fish after freezing, i.e., to coat the fish with a thin coating of water to thereby protect the fish from exposure to ambient oxygen.

Finally, the prior art has taught various methods for freezing fish. For nearly a century prior to the filing of this application it has been known to freeze fish and other foods as quickly as possible to prevent formation of ice crystals of a size sufficient to disrupt the cellular walls of the fish; see e.g., Birdseye, U.S. Pat. No. 1,773,080. The various mechanisms of fish decay are also known to be impeded by freezing the fish. For instance, it is known that bacterial metabolic action decreases dramatically as the temperature falls below freezing, and in particular as the temperature drops below 0° F. Certain other rancidity causing reactions, in particular those connected with decay of fats in the fish, can continue until the temperature of the fish drops to $-10°$ F. or below, and thus by cooling the fish, such decay can be avoided.

For a variety of reasons, some related to cost and difficulty and others related to custom and convention, many commercial fisherman have failed to adapt efficient techniques that build on the foregoing knowledge in the art. The present invention seeks to provide, in some embodiments, methods for freezing and for processing fish, which methods, when practiced in preferred form, facilitate and improve upon the prior teachings in the art. In other embodiments, the invention seeks to provide an apparatus that is not only useful in connection with fishing operations but also for numerous other operations, for instance, the freezing of other food products. In another embodiment, the invention seeks to provide a fish stunning apparatus.

THE INVENTION

Numerous methods and devices are contemplated by the invention and are disclosed and described in the various embodiments set forth herein. It has been discovered that by combining several sound fishing practices and by exsanguinating the fish while the fish remains underwater excellent results may be obtained. It is believed that exsanguinations of the fish underwater assists in the preservation of the mucosal layer and thus is beneficial during freezing and storing of the fish.

In accordance with one embodiment of the invention, a method for freezing fish and other edible marine animals having a microbially protective mucosal layer is provided. The method comprises, in preferred embodiments, stunning the animals with a stunning gas in an aqueous medium, exsanguinating each of the animals by cutting each of the animals while the animals are in the aqueous medium, the animals being cut in a manner effective to substantially preserve the mucosal layer, and immersion freezing the animals by introducing the animals into a liquid aqueous cooling medium that has a temperature of $-20°$ F. or below. Preferably, the animals reach a core temperature of 0° F. or below during a time period of 120 minutes or less. The method is equally applicable on board a commercial fishing vessel or other vessel or on land. The fish are preferably glazed after freezing to provide further protection against decay caused by a microorganisms and oxygen.

The cooling medium used in conjunction with these and other embodiments of the invention may be a salt brine, preferably including an organic cooling agent. Numerous organic cooling agents are contemplated for use in connection with the invention. In some embodiments, the cooling agent may be a non-toxic oil, such as isopar or a terpene (such agents generally not being used in conjunction with the salt brines). In other embodiments of the invention, the cooling agent is a carbohydrate. Generally, the carbohydrate should have a molecular weight ranging from 180 to 1,500, and is preferably a lower order sugar. Sugar alcohols, such as sorbitol, also may be used as the organic cooling agent in conjunction with the invention. In other embodiments of the invention, hydrocarbyl aldosides, such as methyl glucoside, or other glycosides may be used as the organic cooling agent, such glycoside also having a molecular weight ranging from 180 to 1,500. The cooling agents heretofore mentioned may be used in mixture with one another or in combination with other ingredients. It is preferred, for instance, that the cooling agent include molasses solids, in which is included carbohydrates and numerous other components.

In accordance with another embodiment of the invention, a method for freezing edible marine animals is provided. The method generally comprises introducing the animals into a liquid aqueous cooling medium that includes at least one organic cooling agent as heretofore discussed. The animals are maintained in the cooling medium for a time period sufficient to reduce the core temperature of the animals to 0° F. or below, the time period being sufficiently short to substantially avoid cell wall rupture upon freezing of the animals. Preferably, the animal comprises an exsanguinated fish, and most preferably comprises exsanguinated salmon.

In another embodiment of the invention, a method for processing edible marine animals is provided. The method comprises catching a plurality of wild marine animals, and freezing the marine animals as heretofore discussed. The edible marine animals then are transported at a temperature sufficient to maintain the core temperature of the animals at 0° F. or less. The method may further comprise storing the edible marine animals for a storage period at a temperature sufficient to maintain the core temperature of the animals at 0° F. or less. The storage period may be any suitable period of time, for instance, a matter of months. In such embodiments of the invention, the storage temperature is preferably −20° F. or below.

In yet another embodiment of the invention, a frozen edible marine animal prepared in accordance with the foregoing method or methods is provided.

The invention also contemplates an immersion freezer, the immersion freezer not being limited to use in connection with edible marine animals. The freezer comprises a liquid cooling medium disposed in a container, the medium being thermally coupled to a refrigerator. The liquid cooling medium comprises an organic cooling agent as heretofore described. Preferably, the freezer further comprises at least one liquid permeable basket that is disposed within and removable from the container. In some embodiments, the invention also covers a freezer that includes the cooling medium wherein the cooling medium is maintained at a temperature of −20° F. or below. A fishing vessel that includes such an immersion freezer is also contemplated by the invention.

The invention further contemplates a marine animal stunning apparatus. The apparatus includes a liquid holding container that has a floor and walls and at least one removable liquid permeable divider which separates the container into a plurality of compartments which include at least a first compartment and a proximal second compartment. The first compartment includes at least one secondary floor plate that is hingedly mounted with respect to the floor of the container about a hinge axis that is proximal the divider. The secondary floor plate is moveable between a first position and a plurality of second positions in which marine animals disposed within the first compartment are urged into the second compartment. The stunning apparatus further includes a stunning gas introduction device that permits fluidic coupling of the container to a source of stunning gas. Preferably, the compartment includes at least a first and second dividers which separate the container into at least first, second and third compartments, the first compartment being proximal to and in fluidic communication with the second compartment and separated from the second compartment by the first divider, and the second compartment being proximal to and fluidically communicating with the third compartment and separated from the third compartment by the second divider. The first compartment includes a first secondary floor plate that is hingedly mounted to the floor as discussed above, as does the second compartment. In some embodiments, the stunning apparatus includes a source of stunning gas, such as $CO_2$, coupled to the stunning gas introduction device.

Numerous other features of embodiments of the invention are contemplated. Certain features of the preferred embodiments of the invention are described in the drawings, in which:

DETAILED DESCRIPTION OF THE PREFERRED EMBODIMENTS

Certain embodiments of the invention are contemplated to be applicable in connection with edible marine animals. The methods of the invention are contemplated in some embodiments to be applicable to the freezing of any edible marine animal, by which is contemplated to include any saltwater or freshwater species of fish, mollusk, shellfish, crustacean, or the like. For instance, the invention is contemplated to be useful in connection with the freezing of tuna, salmon, cod, halibut, tilapia, flounder, snapper, bass, turbot, sole, herring, red & gray mullet, swordfish, anchovy, pomfret, pompano, skate shrimp, monkfish, pollock, quahog, mackerel, smelt, catfish, shark, kobia, trout, perch, trigger, wahoo, squid, octopus, mussels, scallop, oyster, lobster, crab, conch, clam, crawfish, eel, or, more generally, any marine animal. "Edible" connotes that any part of the animal generally may be consumed for nutritive value; for instance, although some species of puffer fish are poisonous as a whole, certain parts of the fish are edible, and the invention is deemed applicable to such animals. In other embodiments (e.g. the freezer described herein) the invention is contemplated to be of even more general applicability, and thus, for instance, the freezer of the invention is deemed to be useful in connection with edible marine animals and for numerous other uses. Such other embodiments of the invention should not be deemed limited in use or scope. The animals may be obtained by farming, but preferably are caught by any suitable means, such as trawling, gillnetting, seining, longlining, otter-trawling, mid-water trawling, bottom-trawling, or the use of weirs or traps, or other suitable methods.

The fish are preferably killed while in a stunned condition. The fish may be stunned via any suitable methodology, such as by shocking the fish concussively or by striking the fish with a blunt object. Preferably, a stunning gas, which in preferred embodiments is carbon dioxide or nitrogen, which may be introduced into environmental water in sufficient quantities to render the fish alive but unconscious. To kill the fish, any suitable methodology may be employed, but the fish preferably are killed by exsanguination. Most preferably, the fish are maintained under water and one of the fish's gills is cut. The fish's heart will continue to pump until the fish has lost a substantial amount of blood, thereby yielding a dead fish that has been exsanguinated. Preferably, the fish is handled only at one of its extremities to avoid bruising the fish and to mitigate against damage to the mucosal layers.

If convenient, the fish may be stored in a keep live system prior to stunning and killing the fish. Keep live systems are conventional and generally include a water holding tank and a source of oxygen that is fluidically coupled to the tank. In some embodiments, the keep live system is disposed on a vessel and is remote from the place where the fish are stunned and killed; for instance, the keep live system may be disposed on a tender vessel and the stunning and killing system may be disposed on land or on a different vessel. In any case, the fish preferably are transferred from the stunning and killing system as quickly as possible after death to an immersion freezer. The immersion freezer contains a cooling medium that is maintained at a temperature below 32° F. to thereby cause the fish to freeze. The invention contemplates the use of a cooling medium that includes an organic cooling agent, in many embodiments preferably in combination with a chloride salt. The chloride salt is preferably at least one selected from the group consisting of sodium chloride, magnesium chloride and calcium chloride. For economic reasons, the chloride salt is preferably sodium chloride. Calcium chloride is believed to provide solutions that yield the lowest freezing point and is thus more generally preferred.

The organic cooling agent may be any suitable organic cooling agent. Preferred cooling agents include carbohydrates having a molecular weight ranging from 180–1500, sugar alcohols having a molecular weight ranging from 180–1500, glycosides having a molecular weight ranging from 180–1500, maltodextrins, hydrogenated maltodextrins, other malto-oligosaccharides, starch hydrolyzates, hydrogenated starch hydrolyzates, and non-toxic oils, and any mixture of the foregoing and of other organic cooling agents. Oils generally are not used in conjunction with salt or aqueous brains. At least some of the foregoing organic cooling agents are believed to provide beneficial effects when used in conjunction with the freezing of edible marine animals and other food products, in that preservation of the mucosal layer is believed to be enhanced, although the invention should not be deemed limited to any such enhanced effect. In addition, certain of the foregoing cooling agents are believed to contribute to a lowering of freezing point in addition to the colligative lowering contributed by the presence of the dissolved material in solution. When used in connection with fish or other food, the cooling agent should be food-grade.

If a carbohydrate is used, the carbohydrate may be any suitable carbohydrate, and may include, for instance, glucose, maltose, maltotriose, lactose, fructose, sucrose, and mixtures thereof. The sugar may be selected from monosaccharides, disaccharides, trisaccharides, tetrasaccharides, pentasaccharides, hexasaccharides, and mixtures thereof. Sugar alcohols of the foregoing, such as sorbitol and maltitol, or other sugar alcohols in the weight range provided may be used in conjunction with the invention. The carbohydrate may be provided as a pure solution, but ordinarily is provided in admixture with other materials, in that an industrial waste stream that includes carbohydrates may be used as a source of such carbohydrates. Carbohydrates can be obtained from a wide range of agricultural based products such as those derived from corn, wheat, barley, oats, sugar cane, sugar beets etc. Suitable sugars include, but are not limited to, corn sugar, cane sugar, beet sugar, sorghum sugar, maple sugar, wheat sugar, tapioca sugar, potato sugar, cassava sugar, and manioca sugar.

Preferred embodiments of the invention employ an aqueous solution of molasses solids. Molasses is the mother liquor left over after crystallization of sugar from materials such as sugar beets and sugar cane. Many grades of molasses are available commercially; one suitable grade is desugared sugar beet molasses, which is molasses from which a second sugar fraction has been taken. As supplied commercially, this product contains 60–75% solids, the solids including carbohydrate, protein, ash, and other components. Further details concerning molasses solids can be found in U.S. Pat. No. 6,080,330 (Bloomer). Most preferably, the molasses solids are used in conjunction with a chloride salt. Preferred embodiments of the solution are set forth in the table below, the products being sold commercially by Grain Processing Corporation of Muscatine, Iowa:

| | |
|---|---|
| GEOMELT 55 | 55% desugared sugar beet molasses solids |
| GEOMELT 65 | 60–75% desugared sugar beet molasses solids |
| GEOMELT S | 27.5% desugared sugar beet molasses solids/11.5% sodium chloride |
| GEOMELT M | 27.5% desugared sugar beet molasses solids/15% magnesium chloride |

A highly preferred solution includes 14% desugared sugar beet molasses solids and 25.6% calcium chloride.

The cooling agent also may be a glycoside, in particular a hydrocarbyl aldoside. Suitable hydrocarbyl aldosides may be glucosides, maltosides, maltotriosides, and mixtures thereof. The hydrocarbyl aldoside may be an alkyl aldoside such as alpha-methyl glucoside, beta-methyl glucoside, methyl furanosides, methyl maltosides, methyl maltotriosides, and mixtures thereof. Preferably, the hydrocarbyl aldoside is methyl glucoside.

The materials listed in the following patents may be used in conjunction with the invention. U.S. Pat. Nos. 6,582,622; 6,440,325; 6,436,310; and 6,299,793 purport to describe de-icing and anti-icing compositions containing carbohydrates of less than about 1,500 molecular weight. The carbohydrates include glucose/fructose, disaccharides, trisaccharides, tetrasaccharides, pentasaccharides, hexasaccharides, and mixtures thereof. The carbohydrate molecular weight is from about 180 to 1,500, preferably about 180 to 1,000. The carbohydrates can be obtained from a wide range of agricultural based products such as those derived from corn, wheat, barley, oats, sugar cane, sugar beets etc.

U.S. Pat. No. 6,468,442 describes a de-icing or anti-icing composition using a sugar-water mixture having approximately 15 to 80 percent by weight of a sugar solid, wherein the sugar solid contains approximately 2–60 percent by weight of a monosaccharide. A variety of sugars are disclosed, including corn sugar, cane sugar, beet sugar, sorghum sugar, maple sugar, wheat sugar, tapioca sugar, potato sugar, cassava sugar, and manioca sugar.

U.S. Pat. Nos. 6,544,434 and 6,315,919 purport to describe de-icing compositions containing hydrocarbyl aldosides including alkyl aldosides, furanosides, maltosides, maltotriosides, glucopyranosides and mixtures thereof. Alkyl aldosides disclosed are alpha-methyl glucoside, beta-methyl glucoside, methyl furanosides, methyl maltosides, methyl maltotriosides, and mixtures thereof.

U.S. Pat. No. 6,506,318 purportedly describes de-icing compositions containing a hydroxyl-containing organic compound selected from the group consisting of hydrocarbyl aldosides, including glucosides, furanosides, maltosides, maltotriosides, and glucopyranosides; sorbitol and other hydrogenation products of sugars, monosaccharides, maltodextrins and sucrose; maltitol; glycols; monosaccharides; glycerol; and mixtures thereof. Suitable hydrocarbyl aldoside include glucopyranoside sucrose and alkyl aldosides such as alkyl glucosides, alkyl furanosides, alkyl maltosides, alkyl maltotriosides, alkylglucopyranosides, and mixtures thereof. Other hydrogenation products of sugars, monosaccharides, maltodextrins and sucrose include maltitol, xylitol and mannitol.

U.S. Pat. No. 6,398,979 describes a liquid deicer composition containing molasses solids. The term "molasses solids" refers to the components of molasses that are not water such as various carbohydrates (e.g. sugars) and proteins. Suitable molasses includes cane molasses, citrus molasses, wood molasses, grain molasses, and combinations thereof. U.S. Pat. No. 6,416,648 is directed to a composition useful for preventing the formation of ice or snow on surfaces or for deicing surfaces having ice or snow. The composition is formed from a waste product of the process of removing sugar from molasses, also known as desugared molasses. The sugar may be removed from sugar beet or cane molasses or other types of molasses such as sorghum or citrus.

Although the invention is operable when the cooling medium is just below 32° F., the cooling medium preferably is at a substantially lower temperature. Most preferably, the cooling medium is at 0° F. or below, more preferably, −5° F. or below, more preferably, −10° F. or below, more preferably, −15° F. or below, more preferably, −20° F. or below, more preferably, −25° F. or below, more preferably, −30° F. or below, more preferably, −35° F. or below, and more preferably, −40° F. or below. The fish are frozen for a time sufficient to reduce the core temperature of the fish to 0° F. or below, preferably −5° F. or below, preferably −10° F. or below, more preferably, −15° F. or below, and most preferably, −20° F. or below. The core of the fish is generally the coldest part of the fish but in any case is not ordinarily warmer than any other part of the fish. The time period for freezing preferably is sufficiently brief that ice crystal formation does not reach a crystal size that would cause rupture of the cellular structure of the fish. The time period is preferably 3 hours or less, more preferably, 2½ hours or less, more preferably, 2 hours or less, more preferably, 90 minutes or less, more preferably, 60 minutes or less, and more preferably, 40 minutes or less. Satisfactory results have been achieved when the fish is frozen for a period of 38 minutes. The fish preferably are then glazed by dipping the fish in fresh water or salt water and imparting a water glaze in any suitable amount, preferably of about 5 to 7% by weight of the fish. The fish are then put back into the freezer (dry) or into a fish hold, and are maintained at a temperature as cold as desired, for instance, at 0° F., −5° F., −10° F., −15° F., or −20° F. The fish may be stored for any suitable period of time, such as 1 day, 1 week, 1 month, 3 months, 6 months, 9 months, or longer. Before or after storage, or between storage at plural locations, the fish may be transported by any suitable means, such as boat, railcar, truck, or the like.

Figure 1:
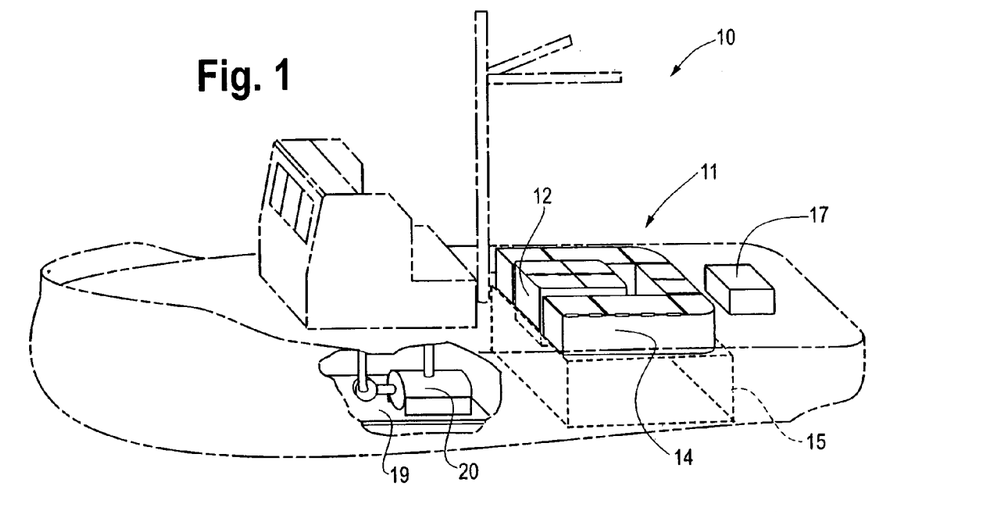
FIG. 1 is a perspective view of a fishing vessel in accordance with the present invention.

With reference to FIG. 1, the illustrated vessel 10 includes a stunning and freezing system 11 which includes a freezer 12 and a stunning apparatus 14. The freezer is disposed in a fish hold 15 and is removable from the hold. In preferred embodiments, the volume of the freezer is substantially smaller than the volume of the hold, such that the hold can accommodate a volume of fish many times greater than that of the freezer and stun system combined. A glaze box 17 is also provided on the fishing vessel. It will be appreciated that the depicted vessel is shown in greatly simplified form, and that in practice the vessel will include devices for catching fish as well as safety equipment and other customary furnishings. The engine room 19 houses an engine (not shown) and a chiller system 20.

Figure 2:
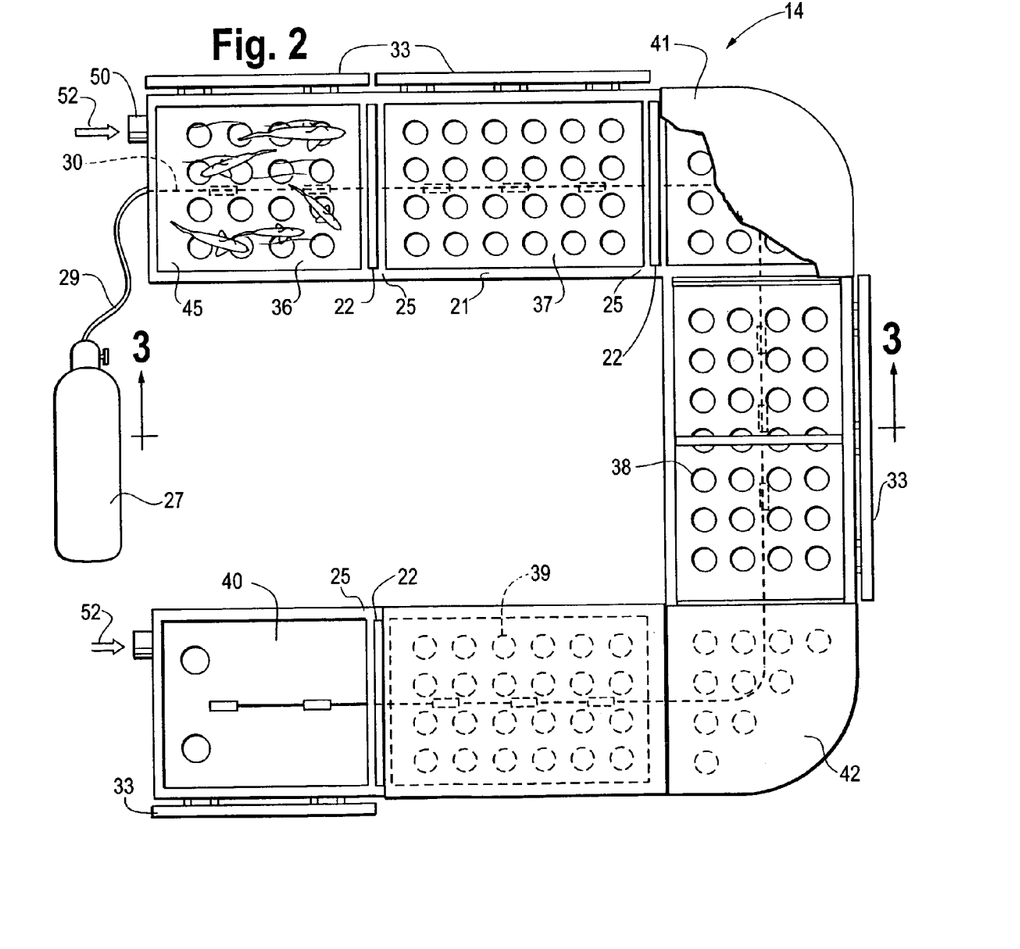
FIG. 2 is a top view, partially cut away, of the stun system of the fishing vessel shown in FIG. 1.
Figure 3:
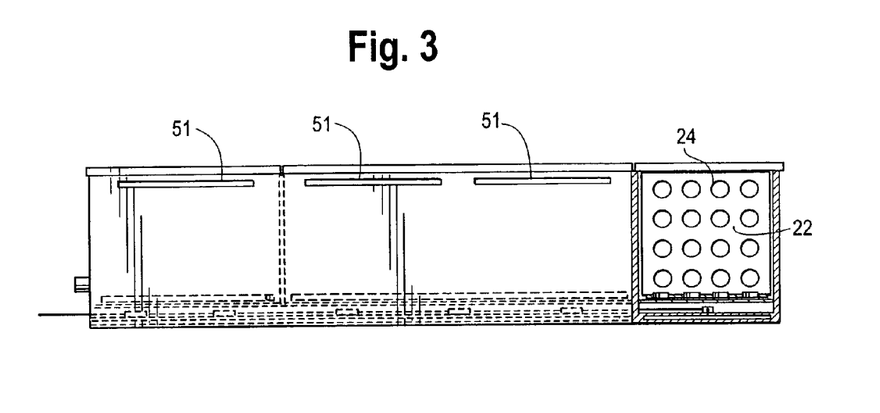
FIG. 3 is a side elevational view in partial cross section of the tank of the stun system shown in FIG. 2.
Figure 4:
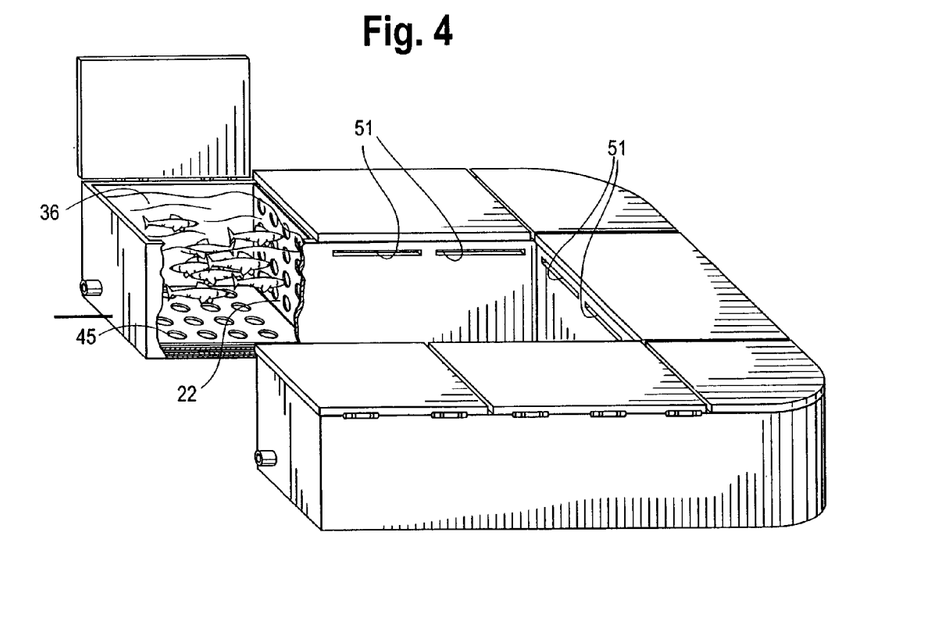
FIG. 4 is a perspective view of the tank of the stun system shown in FIG. 2, shown with fish having been introduced into the first compartment of the tank.

With further reference to FIG. 2, the stunning apparatus 14 includes a tank 21 includes a plurality of dividers 22 (better shown in FIGS. 3 and 4). The dividers 22 separate the container into a plurality of compartments. Seven compartments are shown in the illustrated embodiment, but in practice more or fewer compartments may be provided. The dividers comprise liquid permeable plates that easily may accommodate the passage of water but that retain animals of a size smaller than the apertures 24 (shown in FIG. 3) in the dividers 22. As further showing in FIG. 2, the dividers ordinarily rest in accommodating portions of the tank 21 which serve as frames 25. A source of stunning gas 27, which is preferably carbon dioxide, fluidically communicates with the tank 21 through a hose 29. The tank preferably is provided with a coupling (not shown) of a conventional type and a gas-permeable hose 30 which extends through at least a portion of the tank 21 and which, in the illustrated embodiment, extends substantially completely the length of the tank 21. The container is provided with covers 33, which on compartments 36, 37, 38, 39, and 40 are hinged and which on compartments 41 and 42 are removable. At least one of the compartments, and preferably all but the final compartment 40, are provided with hinged secondary floor plate, (one shown as plate 45) for urging fish and other marine animals from compartment to compartment. Preferably, a pump is provided and is fluidically coupled to a water intake 50 for providing fresh water to the container. Drains 51 are provided for cleaning and draining and ordinarily are plugged with plugs 54.

Figure 5:
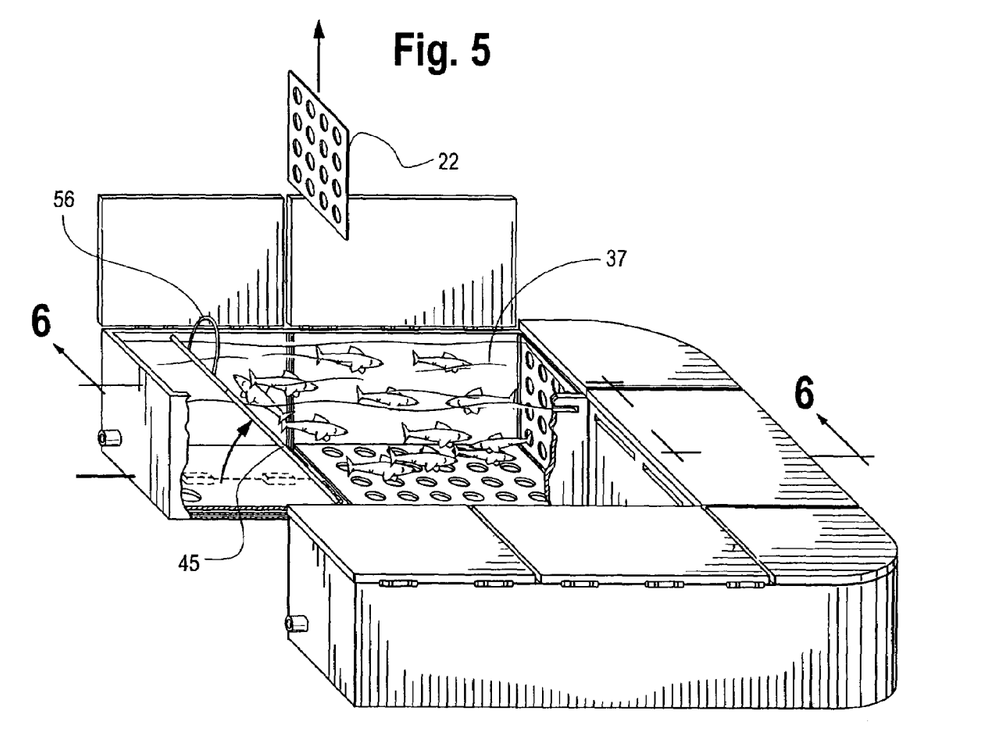
FIG. 5 is a perspective view of the tank of the stun system shown in FIGS. 2 and 4, shown as the fish are being transferred from the first compartment to the second compartment.
Figure 6:
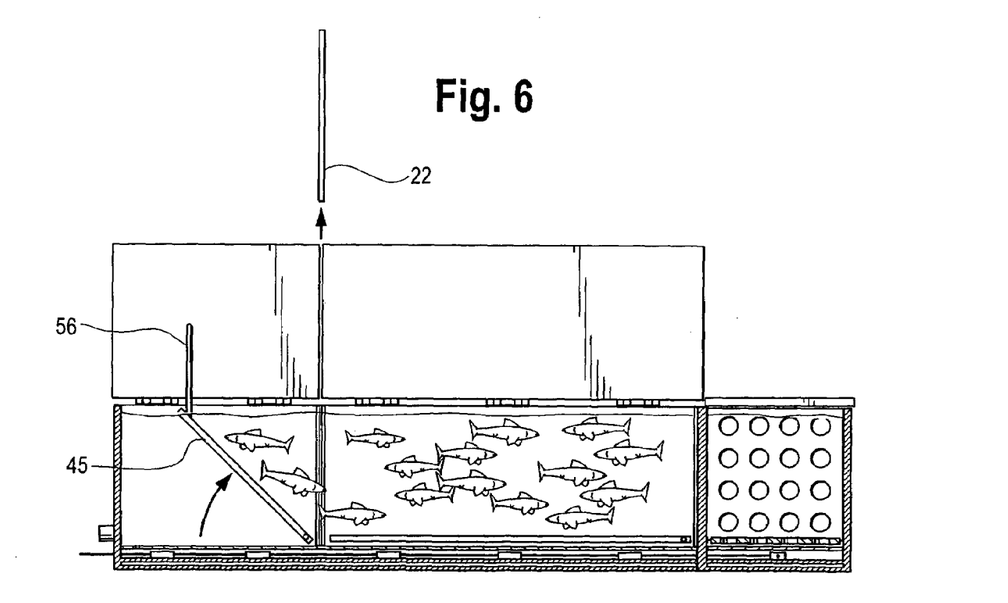
FIG. 6 is a sectional view taken along line 6—6 in FIG. 5.
Figure 7:
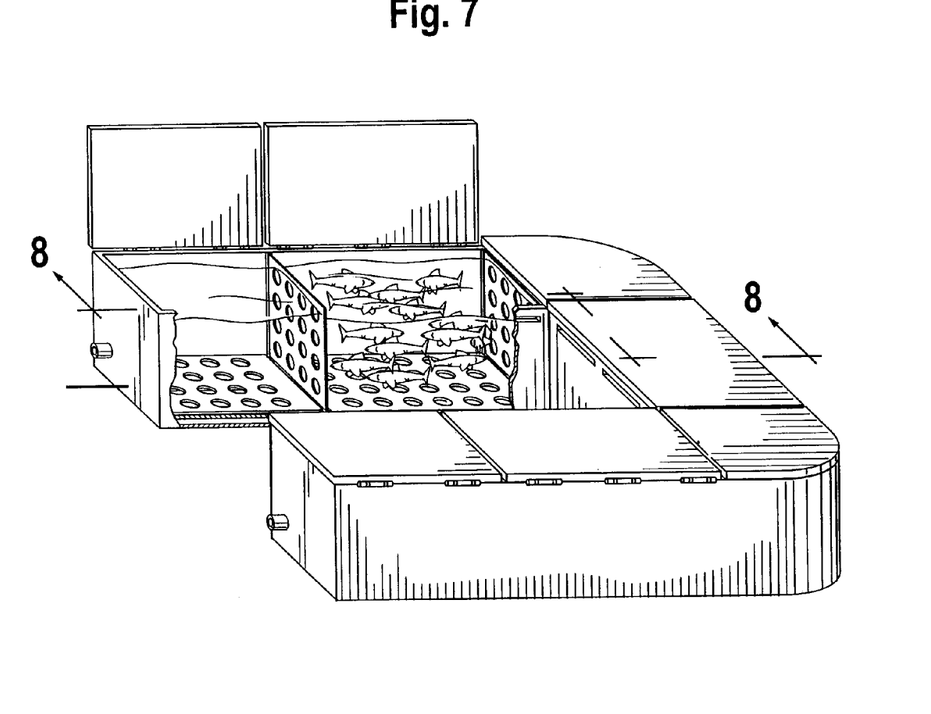
FIG. 7 is a perspective view of the tank of the stun system shown in FIGS. 2 and 4, shown after the fish have been moved from the first compartment to the second compartment.
Figure 8:
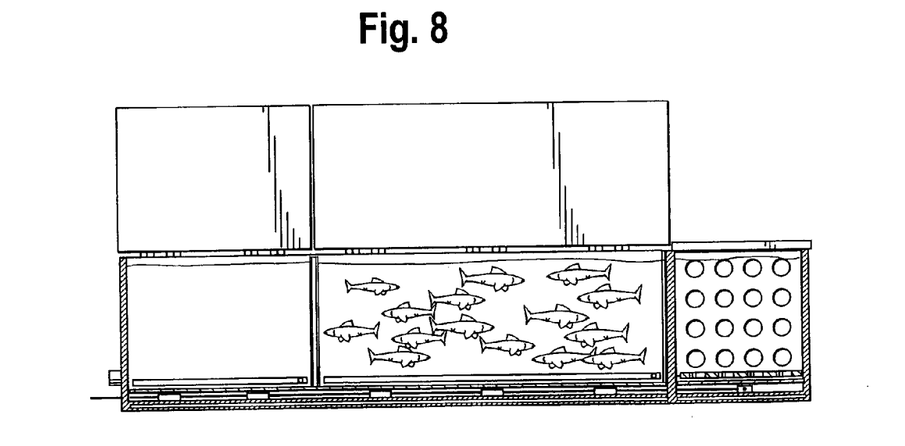
FIG. 8 is sectional view taken along line 8—8 in FIG. 7.
Figure 9:
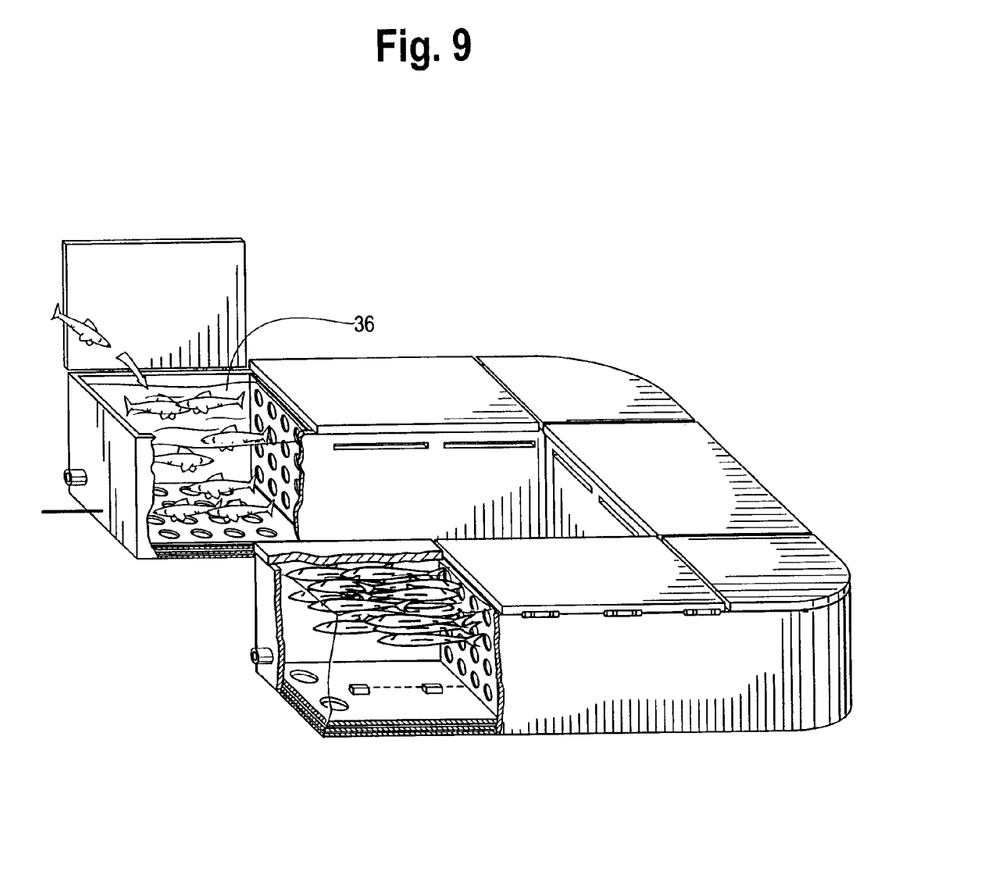
FIG. 9 is a perspective view, partially cut away, of the tank shown in FIGS. 2 and 4, showing the fish having reached the last compartment and new fish having been introduced into the first compartment of the stun system.

With reference to FIG. 4, fish are introduced into the first compartment 36. Via the action of the stunning gas, the fish become stunned and unconscious. As shown in FIGS. 5 and 6, the divider 22 is removed from the frame 25 and the hinged floor plate 45 is grasped, preferably via handle 56, to urge the fish into compartment 37. This process may be repeated for the remainder of the compartments. In each of the compartments, fish preferably are killed as they become stunned and unconscious. With reference to FIG. 9, by the time the fish reach the final compartment, preferably all of the fish have been or are here exsanguinated and killed. New fish may be generally continuously introduced into the first compartment 36, as illustrated in FIG. 9.

Figure 10:
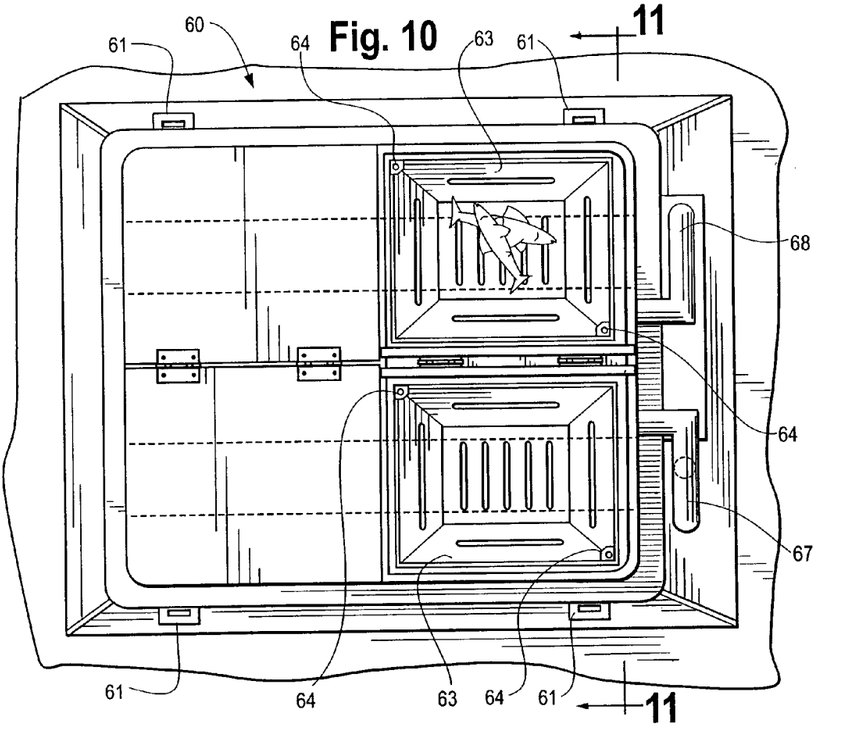
FIG. 10 is a top view of the immersion freezer shown on the fishing vessel illustrated in FIG. 1.
Figure 11:
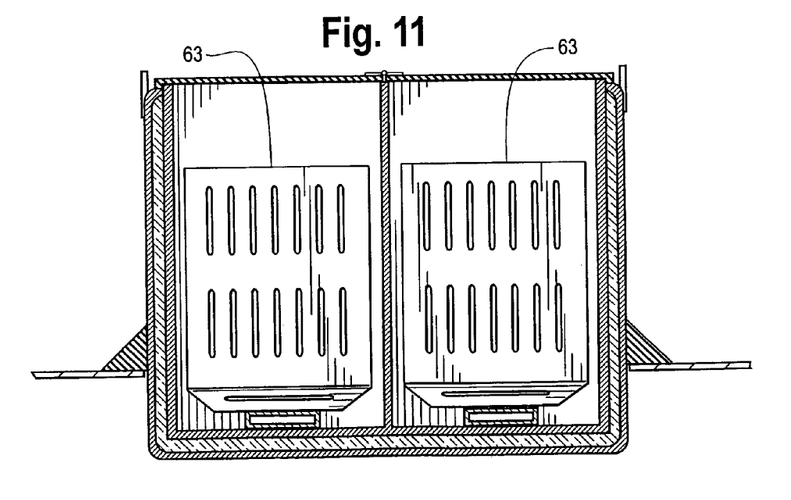
FIG. 11 is a section taken along line 10—10 in FIG. 10.

With reference to FIG. 10, the freezer 60 includes four compartments each with hinged covers (two covers are shown as open in FIG. 10 and two are shown as closed). The freezer is provided with a plurality of lifting eyes 61 to enable the removal of the freezer from a ship hold. With further reference to FIG. 11, the freezer is provided with liquid permeable baskets 63 into which fish are introduced. As shown in FIG. 10, the baskets are provided with eyes 64 to enable the removal of the baskets from the freezers. Cooling medium suction and discharge pipes 67, 68 are also provided, as set forth in more detail hereinbelow.

Figure 12:
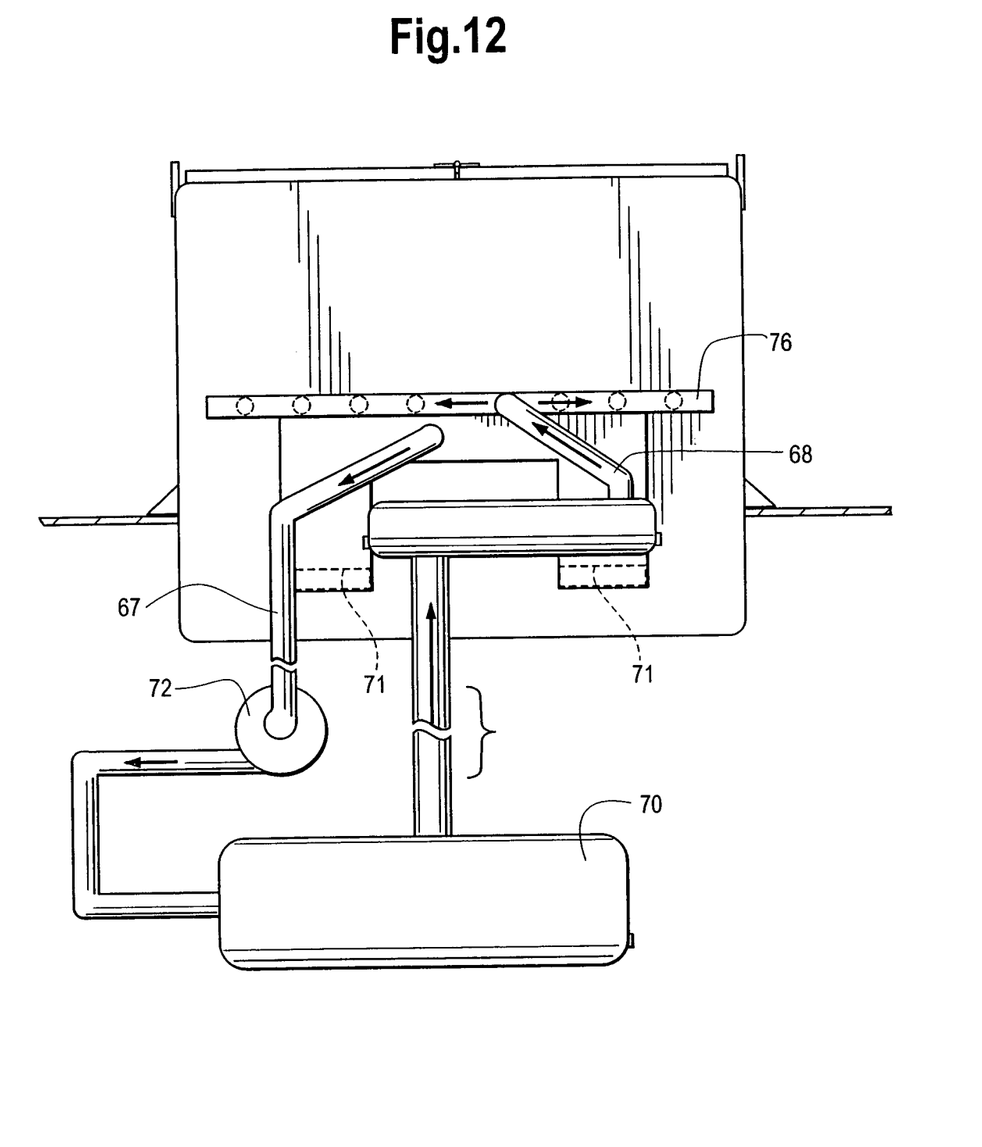
FIG. 12 is a side view of the freezer shown in FIG. 10, and further illustrating in schematic view a pump and chiller system.

With further reference to FIG. 12, the cooling medium is circulated through a chiller 70 by via the suction and discharge pipes 67, 68. The fluid is urged via suction through channels 71 and into the suction pipe 67. A pump 72 causes circulation through the chiller 70 and back through a clarifier 75 into the discharge pipe. The clarifier is conventional and may be a membrane clarifier, such as that sold by MSS. The discharge pipe preferably is disposed at a higher level than the suction pipe, and discharges the coolant through a discharge manifold 76.

Figure 13:
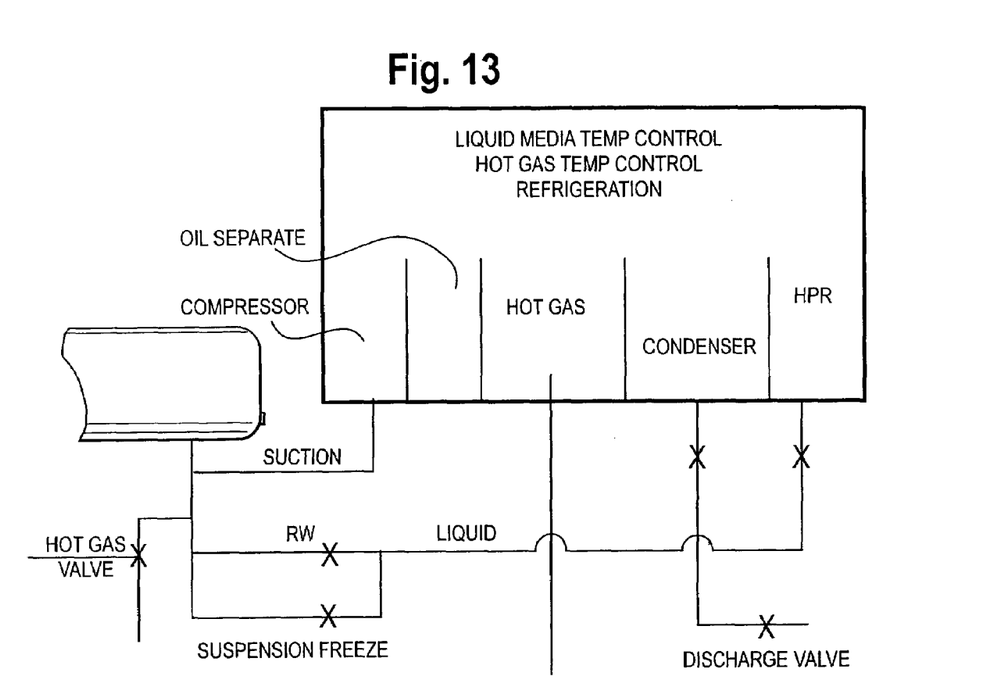
FIG. 13 is a schematic representation of the primary refrigeration system used in connection with the tank shown in FIG. 10.

With further reference to FIG. 13, the refrigerator is preferably of a conventional type and includes a compressor, oil separator, hot gas release, condenser, and high pressure receiver. The refrigerant may be any suitable refrigerant, such as R717, Freon, or ammonia. Many suitable refrigeration units are available commercially; for instance, suitable units are manufactured by Copeland and Carrier. The compressor may be of any suitable type, such as a reciprocating compressor, a screw compressor, or a rotary compressor. Likewise, the pump 72 shown in FIG. 12 may be any suitable pump and may operate at any suitable pressure, such as 18–25 psi. The raw water valve (RW) in some embodiments is kept closed.

Figure 14:
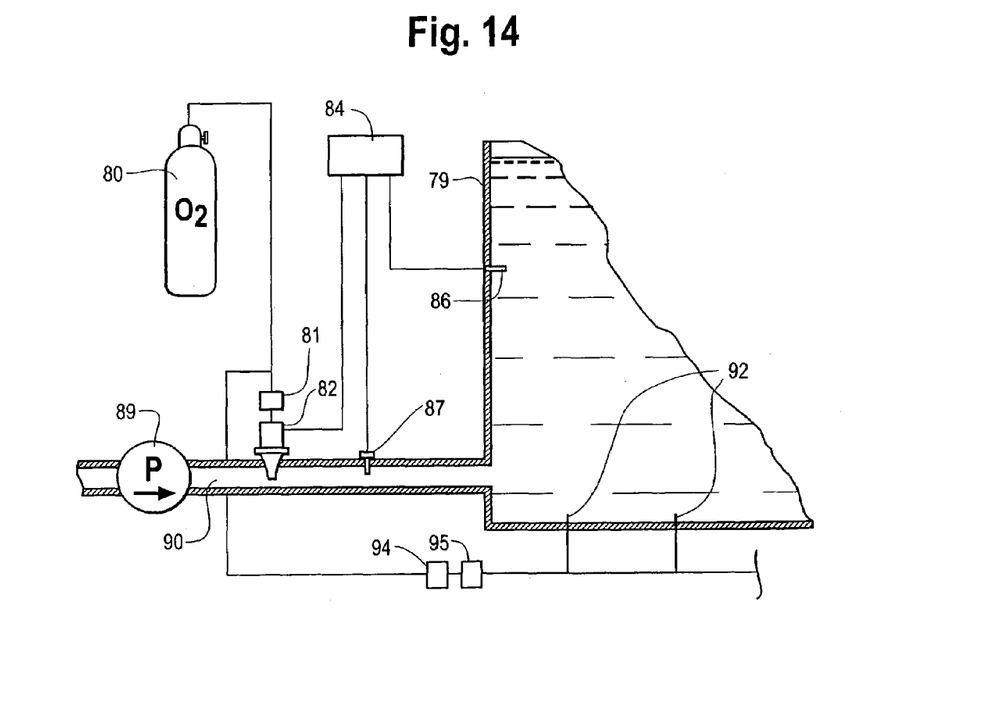
FIG. 14 is a schematic illustration of a "keep live" system useful in connection with the immersion freezer and stun system illustrated in FIG. 1–13.
Figure 15:
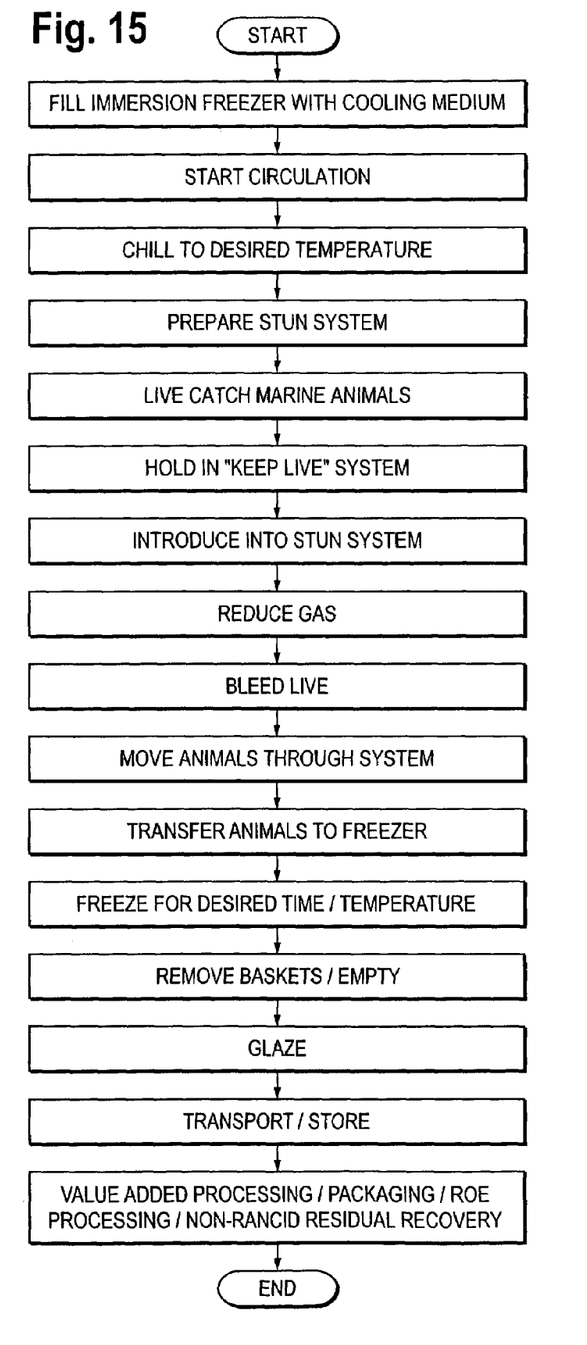
FIG. 15 is a flow chart representing steps in a method for processing marine animals.

With reference to FIG. 14, the illustrated keep live system includes a holding tank 79 and a source of oxygen 80 fluidically communicating with the tank 79 a regulator 81 and electronically controlled valve 82. A multi-channel controller 84 is provided, which controller communicates with probes 86, 87 and with valve 82. Water is pumped via pump 89 through conduit 90 into the tank 91, and oxygen as necessary is introduced into the water intake line 93. Additional oxygen is further introduced where needed through flat hoses or valves 92 at the bottom of the tank 91. A regulator 94 and valve 95 may be provided in practice. The controller may monitor for any desired oxygen level in the intake 94 and in the tank 91.

It is thus seen that the invention provides various methods and devices as heretofore described. When used in conjunction with a commercial fishing operation, the methods and the freezer and stun system provided by the invention can enable fishing vessel to provide fish of outstanding quality. The invention can enable storage of marine animals for an extended period of time with little concomitant loss of quality.

Particular embodiments of the invention have been shown, but the invention should not be deemed limited thereto. No non-claimed elements should be deemed to be a limitation in any of the following claims. Any of the methods described herein may be performed in any suitable order, and the construction of the equipment may be otherwise as herein indicated. In the claims that follow, certain claims specify a cooling agent "selected from the group consisting of" certain cooling agents, but this language should not be read as excluding the presence of other cooling agents in the cooling medium. All modifications and equivalents as permitted by applicable law should be deemed encompassed by the following claims. All references cited herein are hereby incorporated by reference.

What is claimed is:

1. A method for freezing edible marine animals, said animals having a microbially protective mucosal layer, comprising:
   stunning said animals with a stunning gas in an aqueous medium;
   exsanguinating each of said animals by cutting each of said animals while said animals are in said aqueous medium, said animals being cut in a matter effective to substantially preserve said mucosal layer, said animals being maintained in said aqueous medium during exsanguinations; and
   immersion freezing said animals by contacting said animals with a liquid cooling medium having a temperature of below 320° F., said cooling medium comprising a chloride salt and an organic cooling agent, said organic cooling agent being an agent selected from the group consisting of isoparaffin or terpene oils, carbohydrates having a molecular weight between 180 and 1,500, sugar alcohols having a molecular weight between 180 and 1,500, glycosides having a molecular weight between 180 and 1,500, and mixtures thereof; and
   maintaining said animals in said cooling medium for a time period, whereby said animals reach a core temperature of 0° F. or below during said time period.

2. A method for freezing edible marine animals, comprising:
   freezing said marine animal by contacting said animals with a liquid cooling medium, said cooling medium comprising a chloride salt and an organic cooling agent, said organic cooling agent being an agent selected from the group consisting of isoparaffin or terpene oils, carbohydrates having a molecular weight between 180 and 1,500, sugar alcohols having a molecular weight between 180 and 1,500, glycosides having a molecular weight between 180 and 1,500, and mixtures thereof; and maintaining said animals in said cooling medium for a time period sufficient to reduce the core temperature of said animals to 0° F. or below, said time period being sufficiently short to substantially avoid cell wall rupture upon freezing.

3. A method for processing edible marine animals, comprising:

catching a plurality of wild marine animals;

freezing said marine animals by contacting said animals with a liquid cooling medium, said cooling medium comprising a chloride salt and an organic cooling agent, said organic cooling agent being an agent selected from the group consisting of isoparaffin or terpene oils, carbohydrates having a molecular weight between 180 and 1,500, sugar alcohols having a molecular weight between 180 and 1,500, glycosides having a molecular weight between 180 and 1,500, and mixtures thereof;

maintaining said animals in said cooling medium for a time period sufficient to reduce the core temperature of said animals to 0° F. or below, said time period being sufficiently short to substantially avoid cell wall rupture upon freezing; and transporting said edible marine animals at a temperature sufficient to maintain the core temperature of said animals at 0° F. or less.

4. A method for freezing edible marine animals, said animals having a microbially protective mucosal layer, comprising:

stunning said animals with a stunning gas in an aqueous medium;

exsanguinating each of said animals by cutting each of said animals while said animals are in said aqueous medium, said animals being cut in a matter effective to substantially preserve said mucosal layer, said animals being maintained in said aqueous medium during exsanguinations; and immersion freezing said animals by introducing said animals into a liquid cooling medium having a temperature of below 32° F., said liquid cooling medium including a chloride salt; and maintaining said animals in said cooling medium for a time period, whereby said animals reach a core temperature of 0° F. or below during said time period.

* * * * *